United States Patent [19]

Goldsmith et al.

[11] Patent Number: 5,010,551
[45] Date of Patent: Apr. 23, 1991

[54] SELF CONTAINED TROUBLESHOOTING AID FOR DECLARED AND NON DECLARED MACHINE PROBLEMS

[75] Inventors: Alan Goldsmith, Fairport; Hugh O. Forbes, Rochester, both of N.Y.

[73] Assignee: Xerox Corporation, Stamford, Conn.

[21] Appl. No.: 339,462

[22] Filed: Apr. 14, 1989

[51] Int. Cl.⁵ .................. G06F 11/00; G01R 31/28
[52] U.S. Cl. ........................... 371/16.4; 355/206; 371/16.5
[58] Field of Search ............. 371/16.4, 16.5, 17, 371/29.1; 355/204, 206, 209

[56] References Cited

U.S. PATENT DOCUMENTS

| | | | |
|---|---|---|---|
| 3,575,589 | 4/1971 | Neema | 235/153 |
| 4,228,537 | 10/1980 | Henckels et al. | 371/23 |
| 4,434,489 | 2/1984 | Blyth | 371/29.1 |
| 4,499,581 | 2/1985 | Miazga et al. | 371/29.1 |
| 4,649,515 | 3/1987 | Thompson et al. | 364/900 |
| 4,654,852 | 3/1987 | Bentley et al. | 371/29 |
| 4,682,158 | 7/1987 | Ito et al. | 340/679 |
| 4,878,179 | 10/1989 | Larsen et al. | 371/22.1 |
| 4,894,829 | 1/1990 | Monie et al. | 371/20.1 |
| 4,912,711 | 3/1990 | Shiramizu | 371/16.1 |
| 4,916,699 | 4/1990 | Ohashi | 371/17 |

FOREIGN PATENT DOCUMENTS

58-66967 4/1983 Japan .

*Primary Examiner*—Charles E. Atkinson
*Attorney, Agent, or Firm*—Ronald F. Chapuran

[57] ABSTRACT

A technique for problem analysis to diagnose a declared machine fault of a suspected machine fault in a reproduction machine having a control with a touch operative user interface and screen display including the steps of placing the machine in a service mode and entering a fault analysis mode to allow access to a library of fault analysis information, providing the option of troubleshooting the declared machine fault by entering into the control a displayed first fault code, or selecting from a group of categories generally describing a problem area to trouble shoot the suspected machine fault including the steps of selecting one of the group of categories to display a plurality of potential defects related to the selected category in icons and/or text including an associated second fault code, matching one of the displayed plurality of potential defects with the suspected machine fault and entering into the control the associated second fault code, and displaying troubleshooting information related to the second fault code.

9 Claims, 11 Drawing Sheets

SELF CONTAINED TROUBLESHOOTING AID FOR DECLARED AND NON DECLARED MACHINE PROBLEMS

BACKGROUND OF THE INVENTION

The invention relates to a self contained troubleshooting aid for diagnosing problems in xerographic machine, and more particularly, to a self contained troubleshooting aid for diagnosing both declared and non-declared machine faults and problems through use of a user interface and screen display.

As reproduction machines such as copiers and printers become more complex and versatile in the jobs they can do, the user interface between the machine and the operator or user, which in essence permits the dialogue between operator and machine, must necesarily be expanded if full and efficient utilization of the machine is to be realized. A suitable interface must not only provide the controls, displays, and messages necessary to activate and program the machine, but also to monitor and maintain the machine, in particular to troubleshoot the machine to correct both declared and non-declared problems and do so in an efficient, relatively simple, and straightforward way.

It should be understood that a declared fault is a fault that is detected or detectable by the machine control. A non-declared fault is a fault that manifests itself as a defect to the customer (for example, poor stapled, dog-eared copy, copy quality defect) but is not detected or detectable by the machine. A declared fault generally identifies an actual or detectable machine fault, whereas a non-declared fault generally identifies a fault that is undetected by the machine control, but can be considered a suspected machine fault.

The prior art is replete with machine diagnostic aids. For example:

U.S. Pat. No. 4,228,537 to Henckels et al. discloses an on-line simulation of circuit faults during a diagnosis mode circuits. Matching with modeled failures by a heuristic approach leads to a highly probable fault diagnosis.

U.S. Pat. No. 4,649,515 to Thompson et al. discloses fault diagnosis methods for process systems. A knowledge base contains information for determination of malfunction causes and pinpoints problems to users.

U.S. Pat. No. 4,654,852 to Bentley et al. discloses an on-line problem determination procedure for diagnosis of faults in a data processing system. A computer senses the configuration of a subsystem and displays text and graphic information regarding control settings. The system directs the operator to select testing of the subsystem components.

U.S. Pat. No. 3,575,589 to Neema discloses a method and procedure for error correction in an information processing device. Various errors and error recovery procedures are classified and indictors of such errors are given which are used to overcome such errors. A visual display means for showing recovery steps is also disclosed.

U.S. Pat. No. 4,682,158 to Ito et al. discloses a guidance device for controlling machine operations of a copier. A display shows prompts for proper operation of the machine in one mode, and displays maintenance prompts in a diagnostic mode.

Japanese Patent No. 58-66967 to Ishizawa discloses a trouble diagnostic device for a copying machine. The device can instruct troubles and places to mend such troubles to the operator by estimating the cause of the troubles in accordance with trouble information given to the device through sensors and operator key entry.

Prior art machines typically provide the service personnel with fault codes or status codes. A difficulty with the prior art diagnostic techniques is often the lack of a self contained method to diagnose machine faults. Once the fault or status code is available, the service personnel must often refer to elaborate and extensive documentation containing troubleshooting diagrams and procedures. In addition, the system is often unable to declare certain types of faults that are becoming unacceptable to the user but still allow for machine operation via a fault code or status code. For example, the user may notice a copy process defect, document or copy paper damage, or a defect in the finishing process such as an unacceptable staple or bind. The cause or source of this type of defect is often very difficult for service personnel to diagnose and correct even with extensive external documentation.

It is an object, therefore, of the present invention to provide a self contained, on-board troubleshooting aid that will reduce the time required to isolate machine declared (actual) or machine non-declared (undetected) faults and problems, and give the service personnel access to a library of fault analysis information to diagnose either actual or undetected faults and guide the service personnel through a displayed icons, text, and code fault correction procedures. Further advantages of the present invention will become apparent as the following description proceeds, and the features characterizing the invention will be pointed out with particularity in the claims annexed to and forming a part of this specification.

SUMMARY OF THE INVENTION

Briefly, the present invention is concerned with a technique for problem analysis to diagnose a declared machine fault or a undetected machine fault in a reproduction machine having a control with a user interface and screen display including the steps of placing the machine in a service mode and entering a fault analysis mode to allow access to a library of fault analysis information, providing the option of troubleshooting the declared machine fault by entering into the control a displayed first fault code, or selecting from a group of categories generally describing a problem area to trouble shoot a undetected machine fault including the steps of selecting one of the group of categories to display a plurality of undetectable defects related to the selected category icons and/or text including an associated second fault code, matching one of the displayed plurality of undetectable defects with the suspected machine fault and entering into the control the associated second fault code, and displaying troubleshooting information related to the second fault code.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
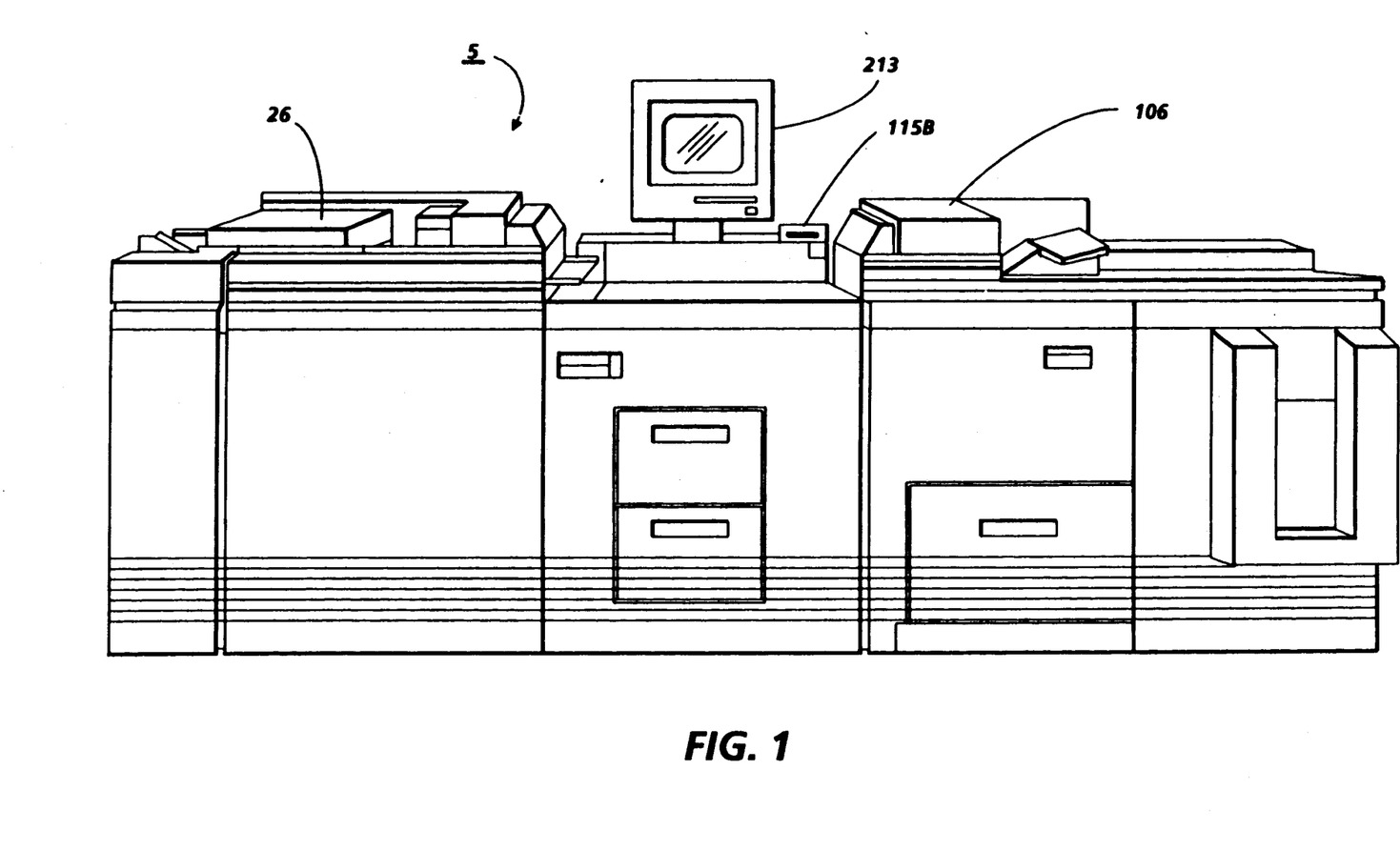
FIG. 1 is an isometric view of an illustrative reproduction machine incorporating the system simulator of the present invention.
Figure 2:
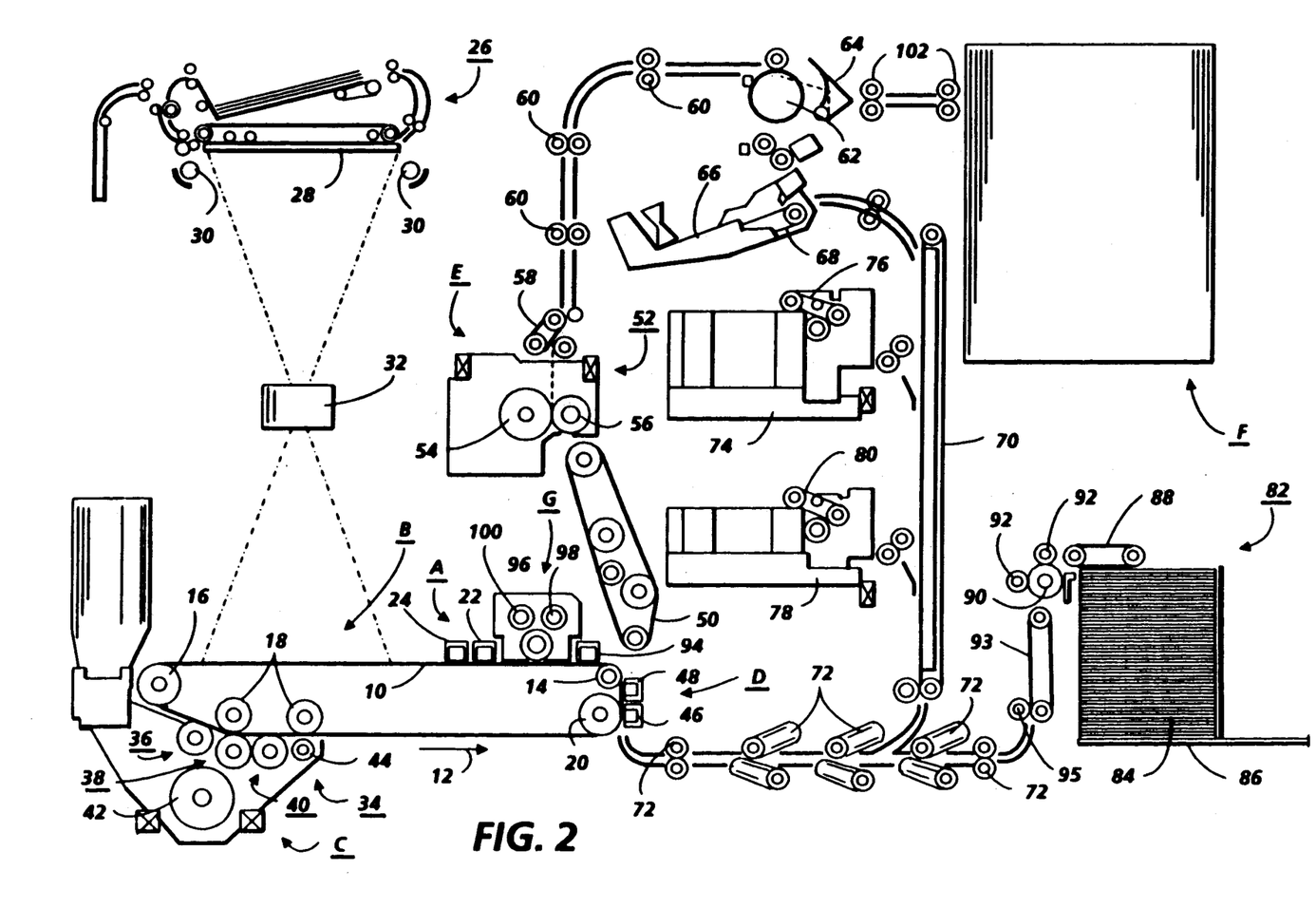
FIG. 2 is a schematic elevational view depicting various operating components and sub-systems of the machine shown in FIG. 1.

Referring to FIGS. 1 and 2, there is shown an electrophotographic reproduction machine 5 composed of a plurality of programmable components and sub-systems which cooperate to carry out the copying or printing job programmed through the touch dialogue User Interface (U.I.).

Machine 5 employs a photoconductive belt 10. Belt 10 is entrained about stripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B. At imaging station B, a document handling unit 26 sequentially feeds documents from a stack of documents in a document stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detack the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station station D.

After transfer station D, photoconductive belt 10 passes beneath corona generating device 94 which charges any residual toner particles remaining on belt 10 to the proper polarity. Thereafter, a pre-charge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

The various functions of machine 5 are regulated by a controller which preferably comprises one or more programmable microprocessors. The controller provides a comparison count of the copy sheets, the number of documents being recirculated, the number of copy sheets selected by the operator, time delays, and jam corrections. Programming and operating control over machine 5 is accomplished through the User Interface. Operating and control information is stored in a suitable memory and loaded into controller and job programming instructions are loaded into the controller through the User Interface. Conventional sheet path sensors or switches may be utilized to keep track of the position of the documents and the copy sheets. In addition, the controller regulates the various positions of the gates depending upon the mode of operation selected.

Figure 3:
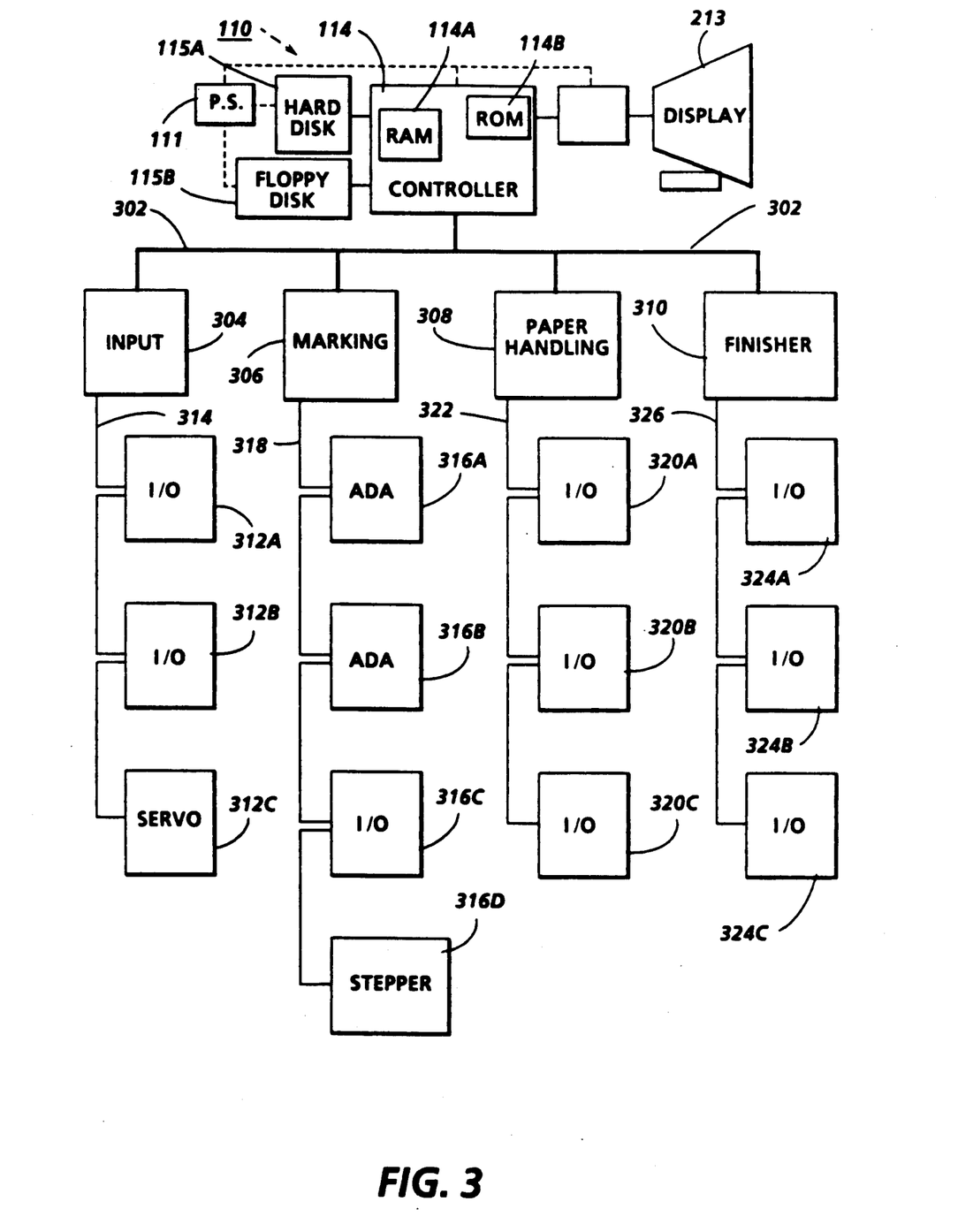
FIG. 3 is a block diagram of the operating control systems and memory for the machine shown in FIG. 1.

With reference to FIG. 3, the User Interface (U.I.) shown generally at 110 includes memory 115 having a hard or rigid disk drive 115A for receiving suitable rigid memory disks and a floppy disk drive 115B for receiving suitable floppy memory disks, both disk drives being electrically connected to Controller 114, the Controller 114 including RAM 114A and ROM 114B. In a preferred embodiment, the rigid disks are two platter, four head disks with a formatted storage capacity of approximately 20 megabytes. The floppy disks are 3.5 inch, dual sided micro disks with a formatted storage capacity of approximately 720 kilobytes. In normal machine operation, all of the control code and screen display information for the machine is loaded from the rigid disk at machine power up. Changing the data that gets loaded into the machine for execution can be done by exchanging the rigid disk in the machine 5 for another rigid disk with a different version of data. In accordance with the present invention, however, all of the control code and screen display information for the machine can be loaded from a floppy disk at machine power up using the floppy disk drive built into the machine 5. Suitable display 213 of U.I. 110 is also connected to Controller 114 as well as a shared line system bus 302.

The shared line system bus 302 interconnects a plurality of core printed wiring boards including an input station board 304, a marking imaging board 306, a paper handling board 308, and a finisher/binder board 310. Each of the core printed wiring boards is connected to local input/output devices through a local bus. For example, the input station board 304 is connected to digital input/output boards 312A and 312B and servo board 312C via local bus 314. The marking imaging board 306 is connected to analog/digital/analog boards 316A, 316B, digital input/output board 316C, and stepper control board 316D through local bus 318. In a similar manner, the paper handling board 308 connects digital input/output boards 320A, B and C to local bus 322, and finisher/binder board 310 connects digital input/output boards 324A, B and C to local bus 326.

Figure 4:
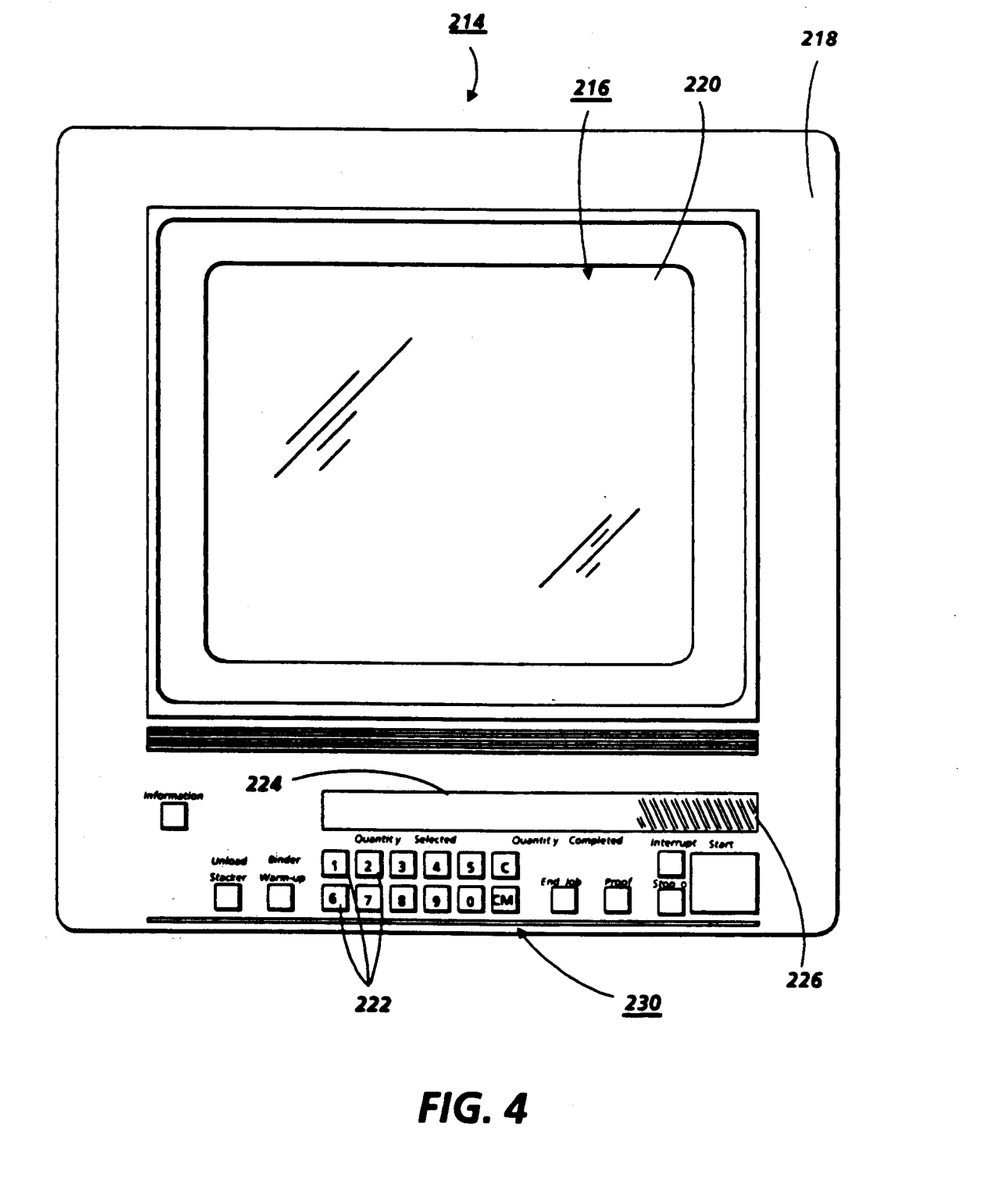
FIG. 4 is a front view of the user interface monitor that is part of the system simulator.

Referring to FIG. 4, there is shown the color touch monitor 214 for the touch dialogue U.I. 110. Monitor 214 provides an operator user interface with hard and soft touch control buttons enabling communication between operator and machine 10. Monitor 214 comprises a suitable color cathode ray tube 216 of desired size and type having a peripheral framework forming a decorative bezel 218 thereabout. Bezel 218 frames a rectangular video display screen 220 on which soft touch buttons in the form of icons or pictograms and messages are displayed as will appear together with a series of hard control buttons 222 and 10 seven segment displays 224 therebelow. Displays 224 provide a display for copy "Quantity Selected", copy "Quantity Completed", and an area 226 for other information.

Hard control buttons 222 comprise "0-9" buttons providing a keypad 230 for programming copy quantity, code numbers, etc., a clear button "C" to reset display 224; a "Start" button to initiate print; a clear memory button "CM" to reset all dialogue mode features to default and place a "1" in the least significant digit of display 224; an "Unload Stacker" button requesting transfer of the contents of stacker 128; a "Stop" button to initiate an orderly shutdown of machine 5; a "Binder Warm-up" button to initiate warm-up of binder 126; an "Interrupt" button to initiate a job interrupt; a "Proof" button to initiate making of a proof copy; an "End Job" button to end the current job; and an "i" button to initiate a request for information. For further details of the control, reference may be had to U.S. Ser. No. 07/164,365 filed Mar. 4, 1988 and incorporated herein.

Figure 5:
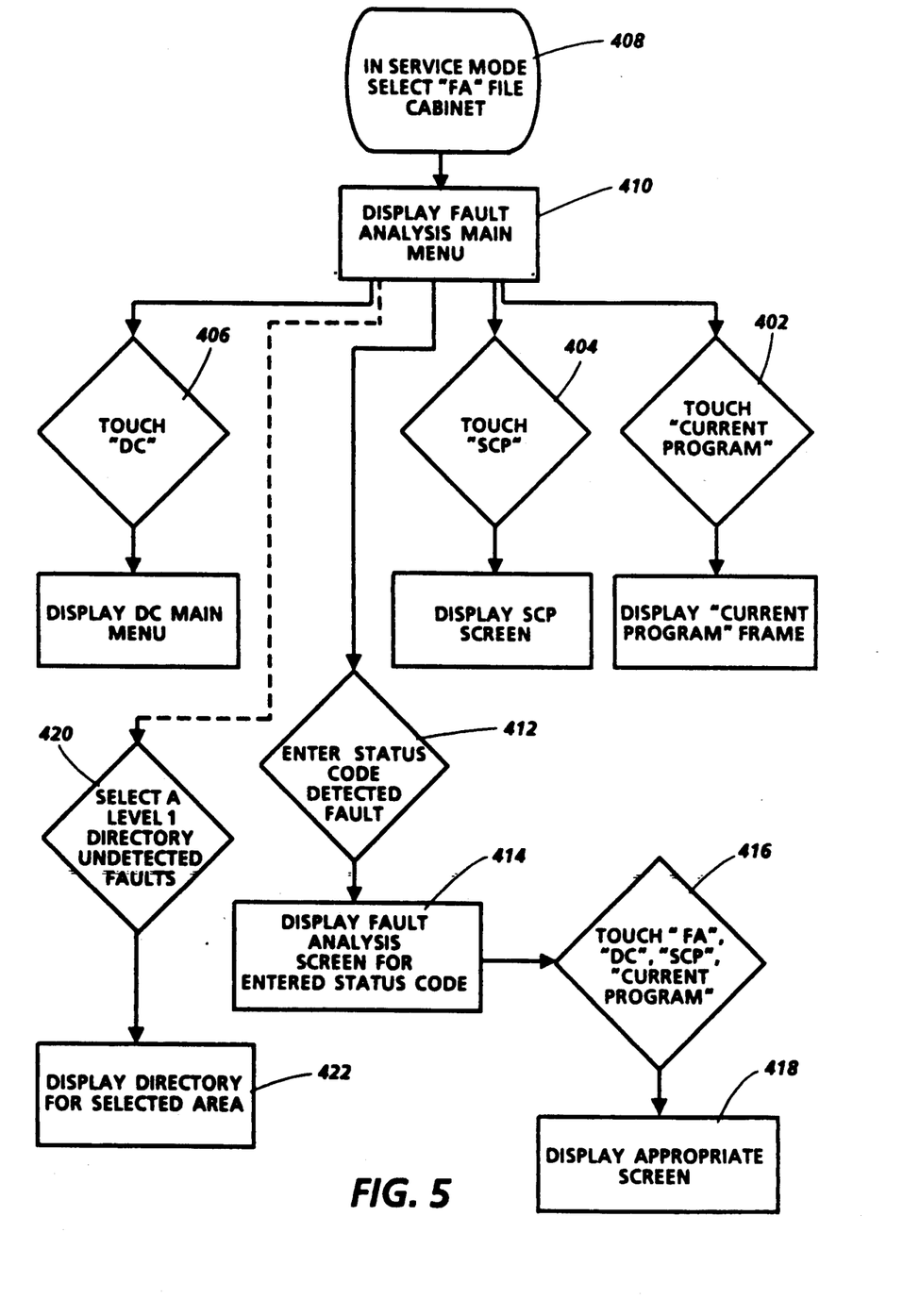
FIG. 5 is an overall flow chart illustrating the two main categories of fault analysis in accordance with the present invention.

In accordance with the present invention, upon entering the service mode by any suitable means such as activation of a designated switch, the service representative can follow any one of four general branches as shown in FIG. 5. The service representative can return to the current program or programmed job in the control counsel via a current program key, as illustrated at 402, to display the current program frame, can touch an SCP key 404 for a service call procedure to review machine history such as a detailed summary of machine data and faults, can touch a DC key 406 to place the machine in a diagnostic mode to perform various diagnostic procedures such as physically checking components, or can select an FA file cabinet 408 to display a fault analysis menu 410. It should be noted that it is within the scope of the present invention to move the control back and forth between any of the four branches, service call procedure, current program, diagnostics and fault analysis by activation of the appropriate key. As illustrated in FIG. 5, the diagnostic DC key 406 will display a DC main menu and the service call procedure key 404 will display a SCP screen.

In accordance with the present invention, as shown in FIG. 5, display of the fault analysis main menu 410 allows the service representative two options of fault analysis. The first option is to enter a status code as illustrated at 412. This assumes that there is a machine fault that has been recognized and declared by the machine. The machine or status code fault will then be displayed at a predetermined location on the display screen on the fault analysis main menu. The service representative can then follow a fault analysis procedure 414 as will be described in more detail below. After analysis of the fault, the service representative can return to the fault analysis main menu, the diagnostic display main menu, the service call procedure, or the current program frame as shown at 416 and 418.

The other option for the service representative upon displaying of the fault analysis main menu 410 is to select a level one directory from the fault analysis main menu display as illustrated at 420 to display a directory for the selected area at 422. The second option connecting the display fault analysis main menu 410 with the select level one directory 420 is shown as a dotted line to illustrate that in this option the machine has not declared a fault contrary to the enter-status code 412 option, but is used rather to determine a problem or correct a problem that is unacceptable to the user or that may lead to machine declared fault.

Figure 6:
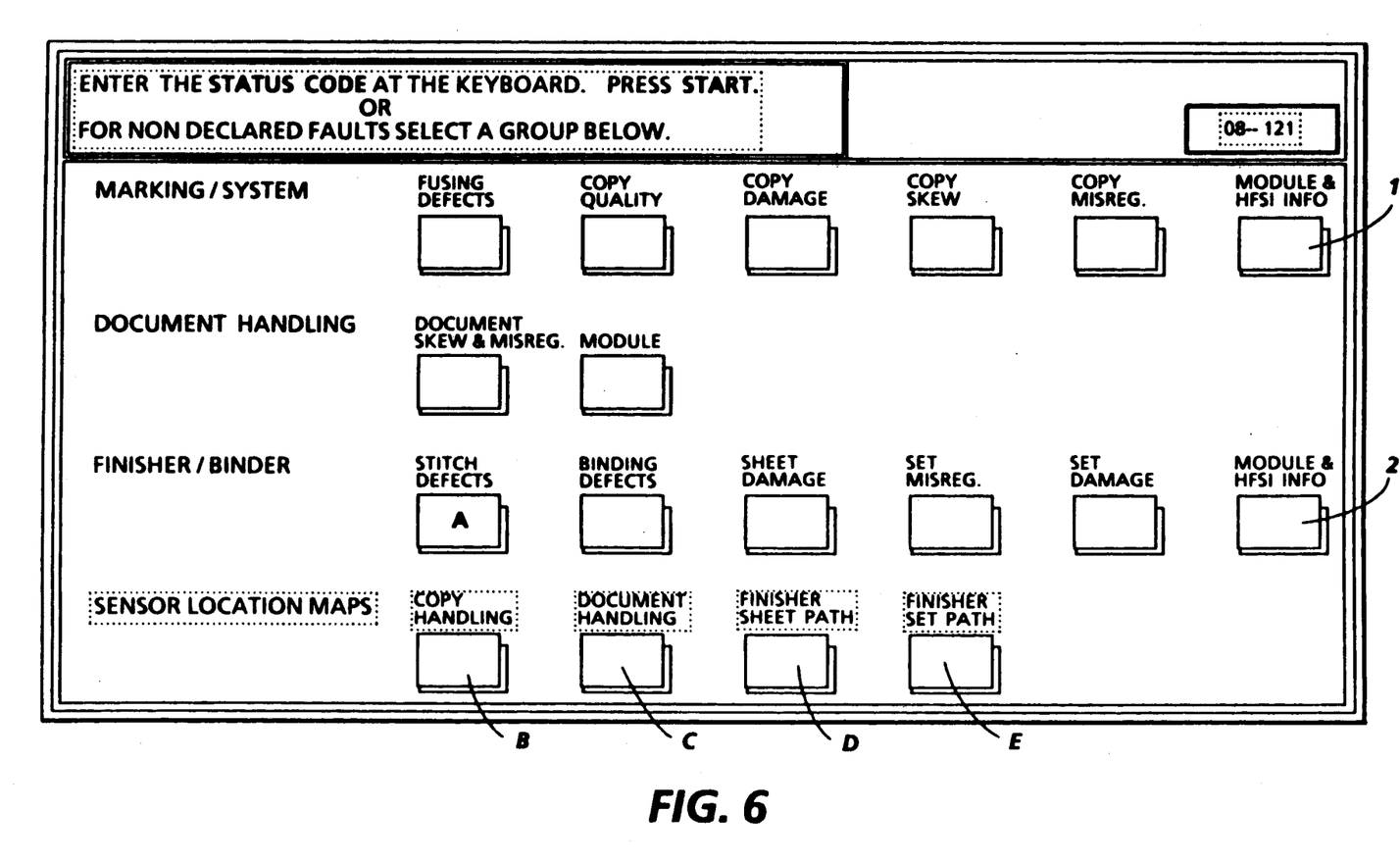
FIG. 6 illustrates the main fault analysis screen display in accordance with the present invention.

The display fault analysis main menu 410 is illustrated in detail with respect to FIGS. 6. A fault code 08-121 is illustrated at 422 in the top right corner of the display representing a declared machine fault. The upper left of the display provides the two options to the service rep, and in particular to enter the status code at the keyboard and press start or for non-declared machine faults to select one of the groups displayed below.

Figure 7:
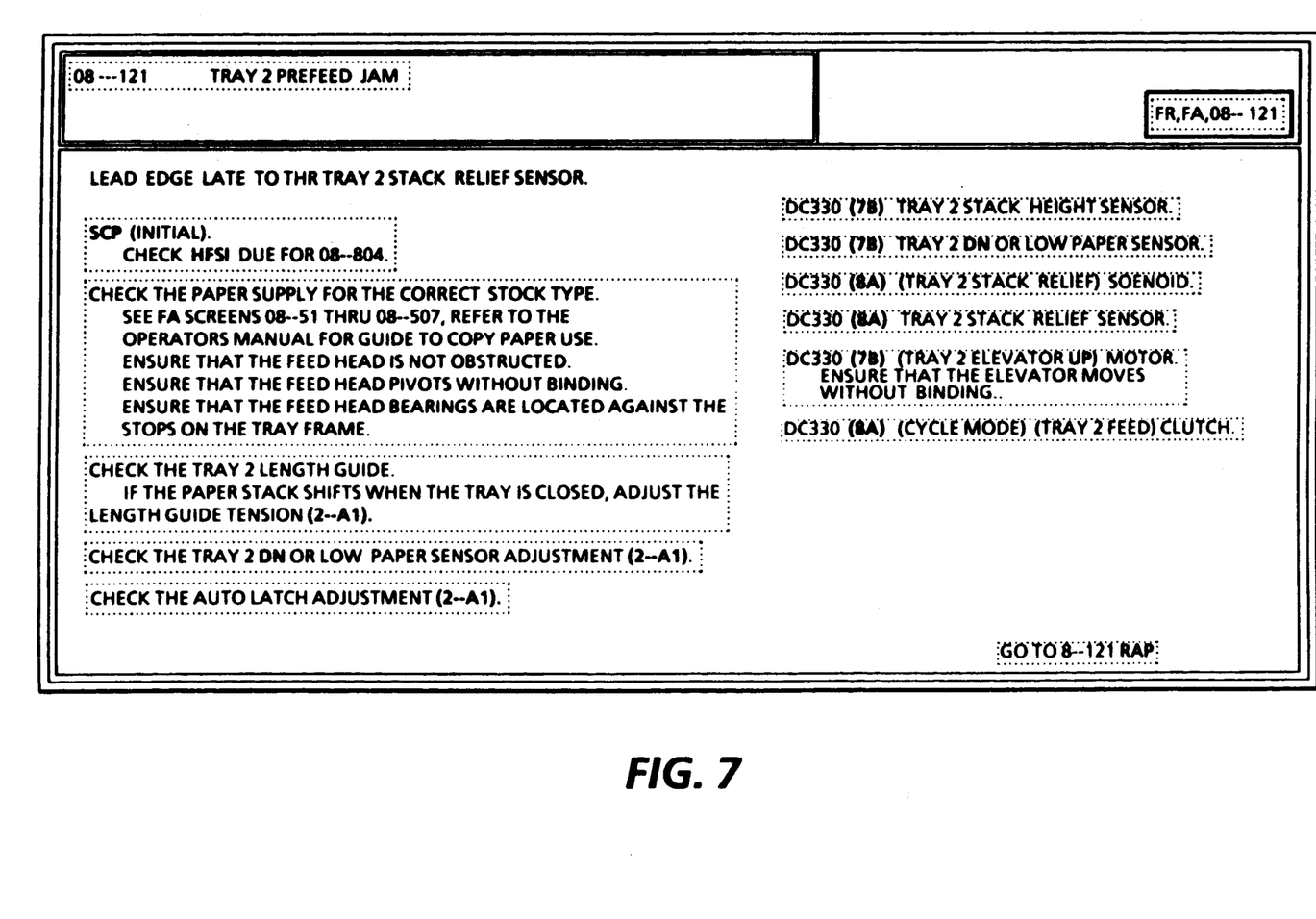
FIG. 7 illustrates a declared or actual fault screen display.

For the service rep to follow the option for a declared machine fault, the service rep would enter the fault code 08-121 into the keyboard shown in FIG. 4, and press the start button as shown in FIG. 4. The display would then show further fault analysis information as shown in FIG. 7. With respect to FIG. 7, in the upper left hand corner of the display there is again illustrated the fault code 08-121 in general defining the fault to be a tray 2 pre-feed jam. There is further information that the lead edge was late to the tray 2 stack relief sensor. In addition, the display now shows various options for the service representative such as check the paper supply for the correct stock type, check the tray 2 length guide, check the tray 2 on or low paper sensor adjustment, and check the auto latch adjustment. There is also displayed various diagnostic procedure input codes such as DC 330 for the tray 2 stack height sensor, the tray 2 on or low paper sensor, the tray 2 stack release selenoid, and the tray 2 stack release sensor as well as other suggested diagnostic procedures. There is also additional information such as for the check paper supply for the correct stock types, a reference to view the fault analysis screen 08-510 through 08-507 or such other instructions as to insure that the feed head is not obstructed, that it pivots without binding, and that the feed head bearing are located against the stops on the tray frame.

For further information, at the bottom right of the display there is a message to go to 08-121 RAP repair analysis procedure in the service manual. It is within the scope of the present invention to provide additional messages to further instruct the service representative. Although not shown, further displays could define the fault code 8.121 as indicating the lead edge of the sheet of the paper failed to move from the top of the stack in tray 2 to the stack release sensor within 245 clock counts after freed clutch was energized.

The displayed information includes instructions to check the condition of the paper in the trays, to clear the feed head of obstructions, and to load transparencies with the white stripe at the lead edge. Also implied are instructions to the service representative that if the tray is stuck in the over travel position, the tray should be hand cranked until the over travel switch is no longer actuated. If the length guide moves away from the paper stack when the tray is closed, the service rep is instructed to adjust the length guide tension, to check the tray down low paper sensor adjustment, and to check the auto latch adjustment.

The service rep is instructed to open tray 2 and cheat the tray 2 interlock switch, and then enter a specific diagnostic routine, and then actuate the tray 2 stack height sensor. If the display changes from high to low, the service rep is then instructed to actuate the tray 2 down/low paper sensor and check if display does changes from high to low. Then the service representative is then instructed to check the tray 2 stack height sensor for a short circuit. In a similar manner, the service representative by various displays can be taken through a series analysis options to determine more precisely the cause of the malfunction without any reference to external documentation.

For the service representative to follow the option for a non-declared or now detectable machine fault, reference is again made to FIG. 6 where there is shown various displays for fault analysis for a non-declared machine fault. For example, for the marking/system there are displayed several touch sensitive buttons representing fusing defects, copy quality, copy damage, copy skew, copy mis-registration, and module HFSI information. For document handling there is shown a document skew and mis-registration button and a module button and for finisher/binder, there is a shown a stitch defect button, a binding defect button, etc. and for sensor location maps there is shown a copy handling button, a document handling button, finisher sheet path button and finisher set path button.

Figure 8:
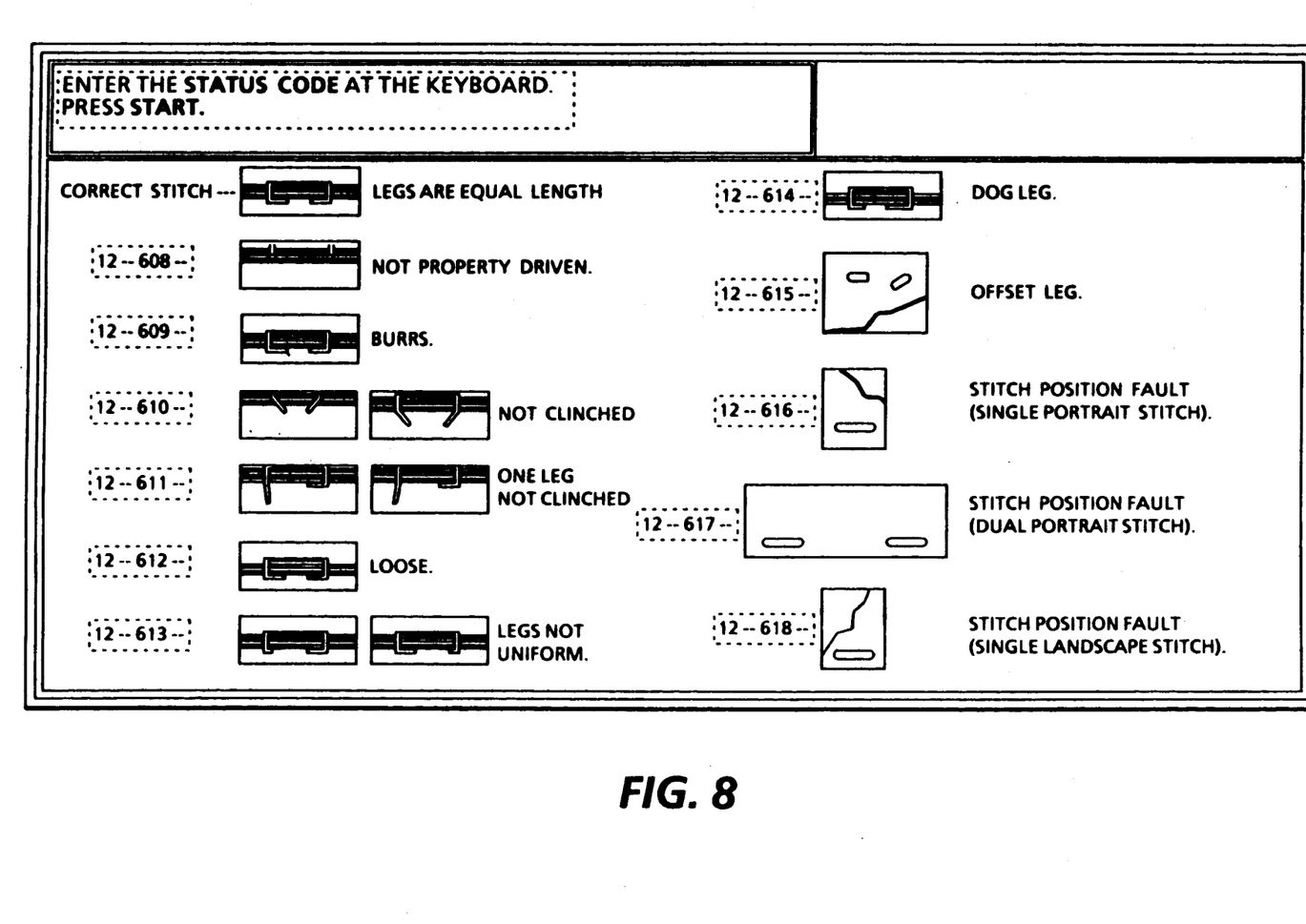
FIGS. 8-11 illustrate a sequence of non-declared or undetected fault displays in accordance with the present invention.

Assume there is a stitch defect that the operator or service representative is aware of, is not a declared fault, the service representative would touch the stitch defect button A, resulting in the display as shown in FIG. 8. As shown, there is an illustration of the correct stitch with the legs of equal length at the top left of the screen. The remainder of the screen illustrates various improper or incorrect stitching operations such as stitch not properly driven, burrs, the total stitch not clinched, one leg not clinched, legs not uniform, and stitch position fault such as single portrait stitch, dual portrait stitch and single landscape stitch. Associated with each of the incorrect stitch images is a code that can be entered by the service representative to further analyze and correct the indicated conditions. The service representative would enter the status code at the keyboard, press start, and the fault analysis system would direct the service representative in a manner similar to entering a declared fault status code as illustrated in FIG. 7.

As another example of a non-declared fault analysis, with reference to FIG. 6, the service representative may suspect a problem in the sensor in the copy handling system. The service representative would then touch the copy handling key B to display the copy handling module paper path sensor location map as shown in FIG. 9.

Figure 9:
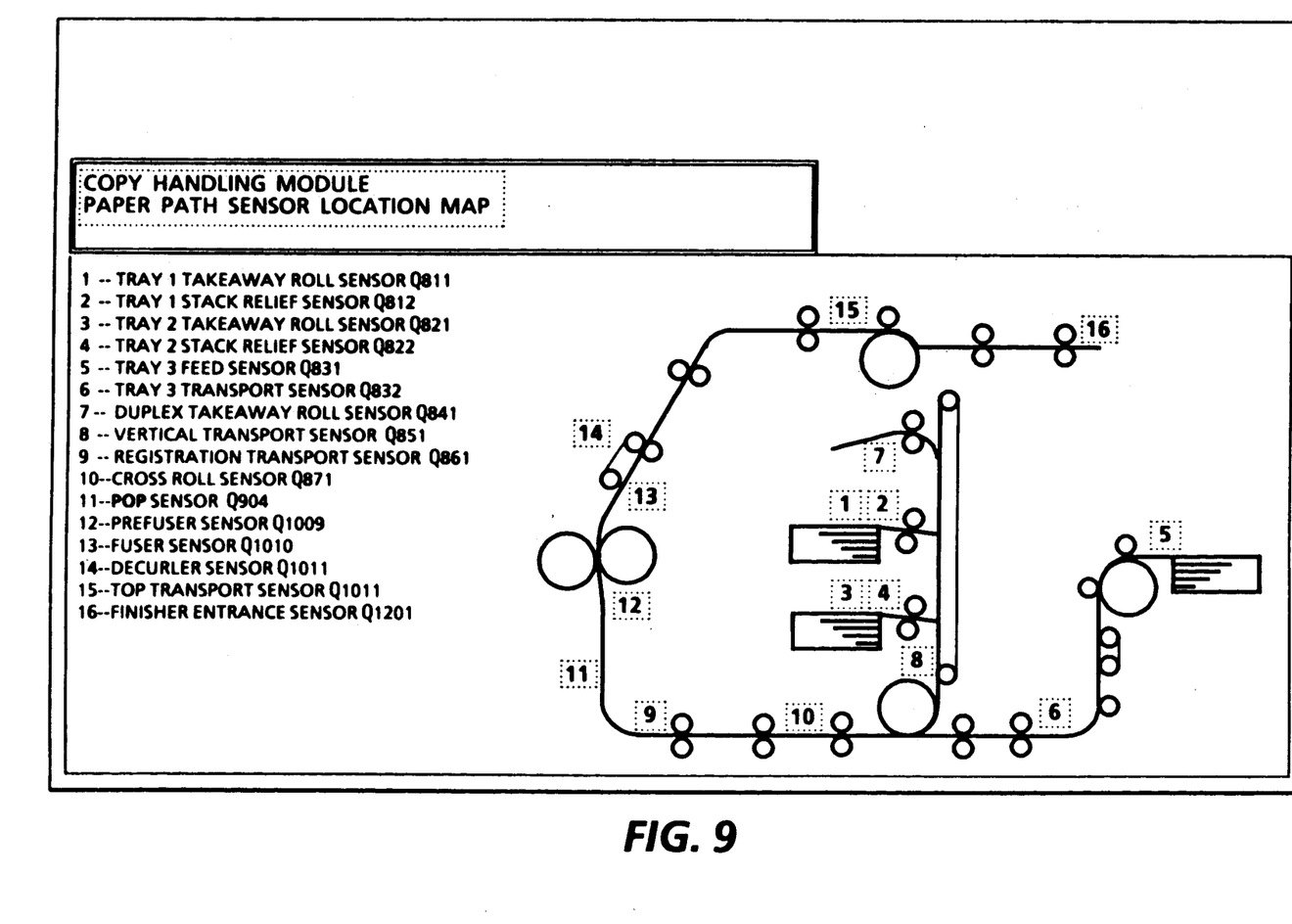
Figure 10:
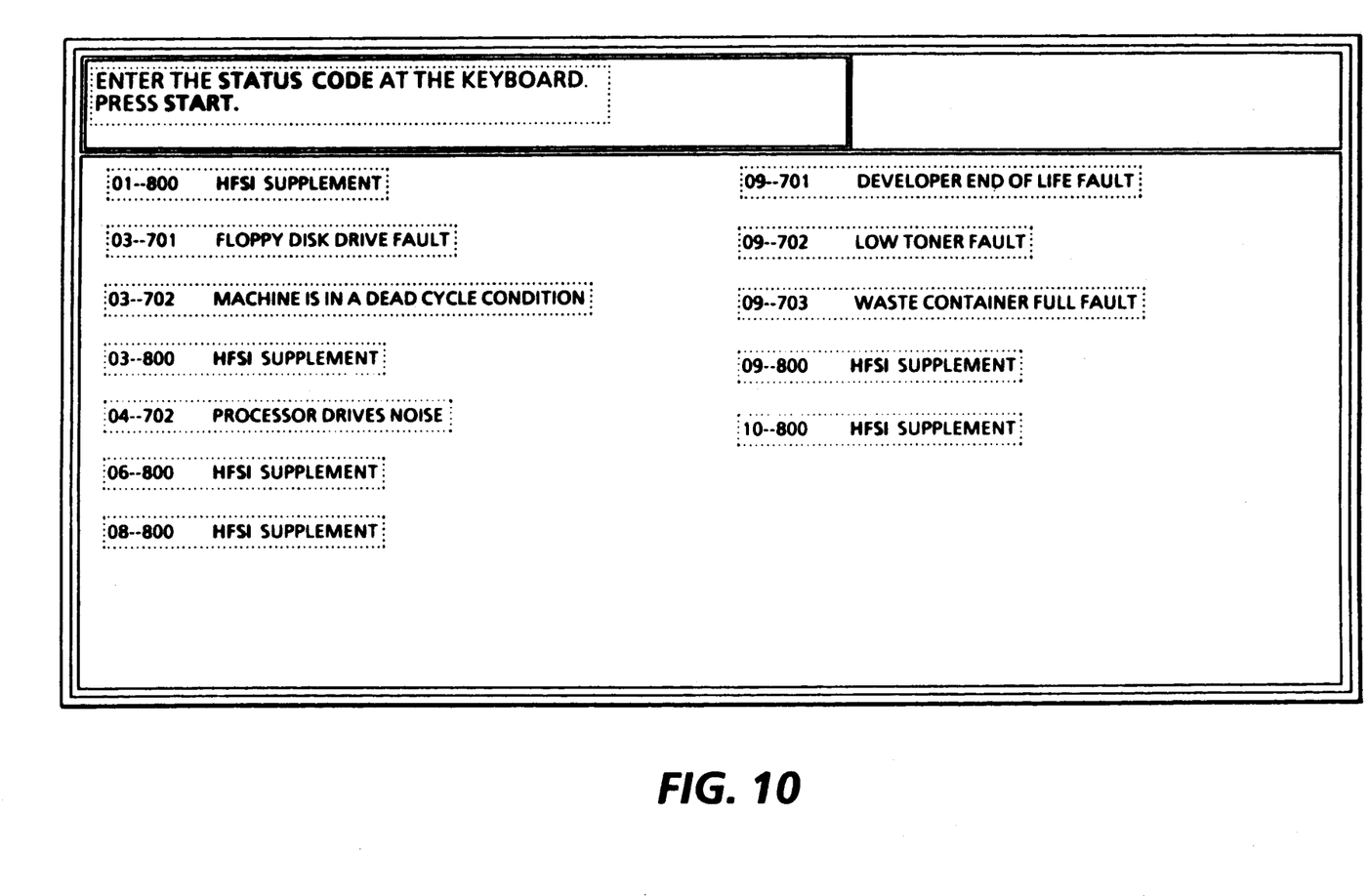
Figure 11:
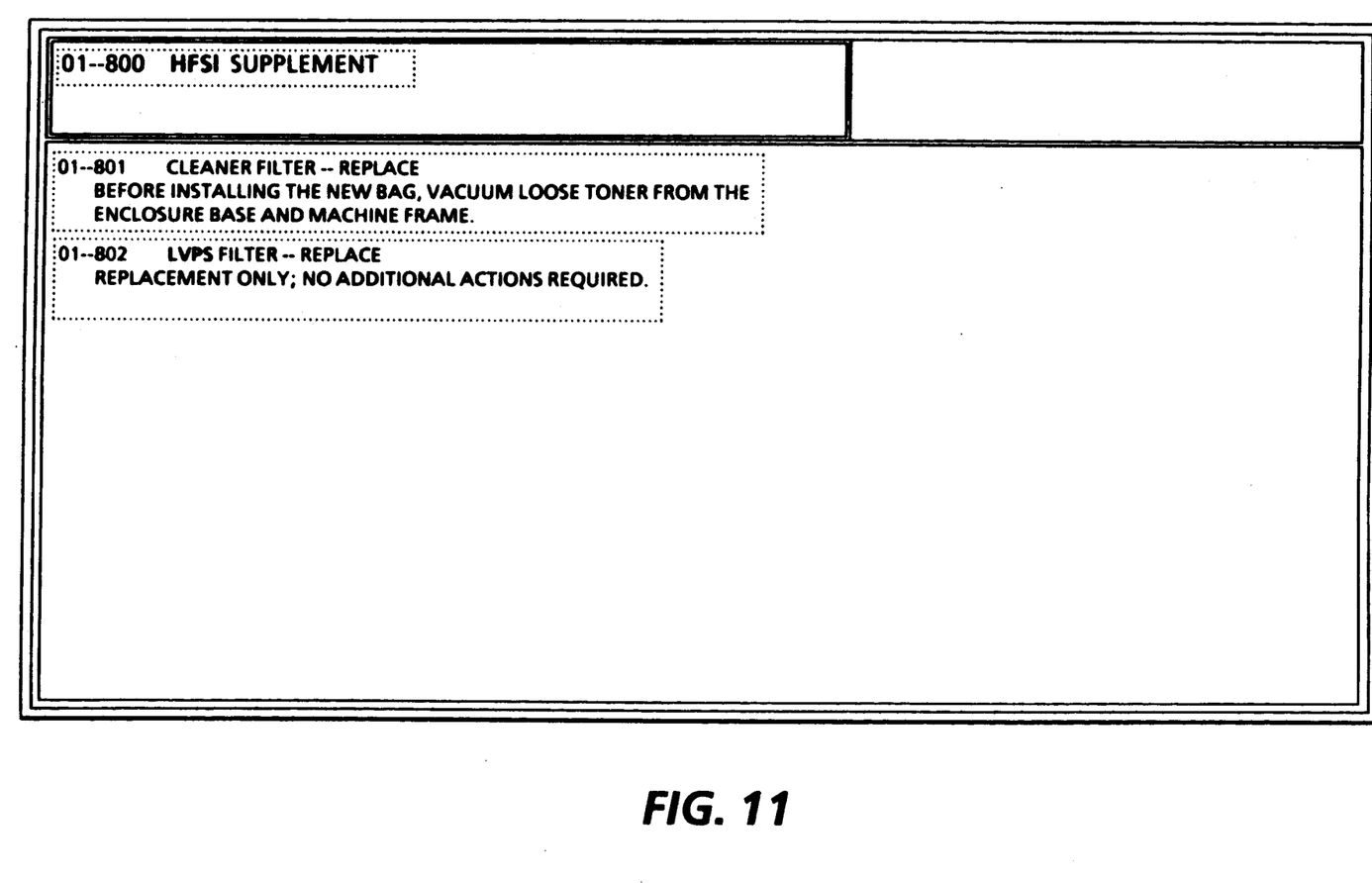

As shown in FIG. 9, there is a pictorial diagram of the sixteen sensors throughout the copy handling system for locational reference, illustrating by number the sensor and the description of the sensor with an associated sensor reference designation. With reference to FIG. 6, th service representative can obtain further information such as by keying the button 1 for the module and HFSI information in the marking system or the button 2 for the module and HFSI information for the finisher/binder. By activation of the No. 1 button in FIG. 6, there is displayed the status code and description information illustrated in FIG. 10, and by activation of the button 2, there is illustrated the information as shown in FIG. 11. With respect to FIG. 10, there are illustrated various fault codes with such conditions as floppy disk drive fault, machine in a dead cycle condition, processor drive noise, etc.. With respect to FIG. 11, there are displayed fault codes and messages such as replace cleaner filter before installing new bag, vacuum loose toner from the enclosure base and machine frame, and with regard to the LVPS filter, to replace only with additional action required. It is thus seen that the service representative is provided with a variety of visual and textural displays when the machine is not yet in a declared fault condition for the service representative to be able to further analyze and correct a non-declared or suspected fault before a machine fault actually occurs.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

What is claimed is:

1. In a reproduction machine having a plurality of interactive machine components cooperable to produce copies from document originals including a control having a touch operative user interface and screen display, a self contained method of problem analysis comprising the steps of:
   entering into a problem analysis mode in the machine,
   providing a portion of the display to manifest a fault code if a machine fault actually exists,
   displaying a first plurality of system indicators related to suspected machine problems,
   touch entering into the control via the user interface a fault code number, if a fault code is manifested in said portion of the display, or
   touch activating one of the, system indicators and
   displaying a second plurality of system indicators related to said one of the systems indicators the second plurality of system indicators providing visual representations to identify said suspected machine problem.

2. In a reproduction machine having a plurality of interactive machine components cooperable to produce copies from document originals including a control having a touch operative user interface and screen display, a method of identifying a non-detected machine fault comprising the steps of:
   displaying on a first screen illustration a plurality of indicators related to the interactive machine components,
   selecting one of the indicators, the indicator identifying a given interactive component and
   displaying on a second screen illustration a visual likeness of a plurality of possible malfunctions related to said given interactive component identified by said indicator, each visual likeness having an associated code, and
   selecting one of said codes to display corrective information on a third screen illustration related to said given interactive component.

3. The method of claim 2 wherein the step of selecting one of said codes to display corrective information on a third screen illustration related to said given interactive component includes the step of displaying a definition of the fault and description of the conditions that cause it, discrete component checks and associated on-board diagnostic checks, or recommendations for parts adjustment or replacement.

4. In a reproduction machine having a plurality of interactive machine components cooperable to produce copies from document originals including a control having a touch operative user interface and screen display, a self contained method of problem analysis to diagnose a declared machine fault or a suspected machine fault comprising the steps of:
   placing the machine in a service mode,
   entering a fault analysis mode to allow access to a library of fault analysis information,
   providing the option of troubleshooting the declared machine fault by entering into the control a displayed first fault code, or
   selecting from a group of categories generally describing a problem area to trouble shoot the non-declared machine fault including the steps of;
   selecting one of the group of categories to display a plurality of undetectable defects related to the selected category including an associated second fault code,
   matching one of the displayed plurality of potential or undetected defects with the suspected machine fault and entering into the control the associated second fault code, and
   displaying troubleshooting information related to the second fault code.

5. The method of claim 4 wherein the step of displaying troubleshooting information related to the second fault code includes the step of displaying a definition of the fault and description of the conditions that cause it, discrete component checks and associated on-board diagnostic checks, or recommendations for parts adjustment or replacement.

6. In a reproduction machine having a plurality of interactive machine components cooperable to produce copies from document originals including a control having a user interface and screen display, a self contained method of analysis of non-detected machine faults comprising the steps of:
   entering into a problem analysis mode in the machine,
   displaying a plurality of sub-system indicators related to non-detected machine faults,
   activating one of the sub-system indicators, and
   displaying a plurality of non-detected machine fault situations related to said one of the sub-system indicators.

7. The machine of claim of claim 6 wherein the sub-system indicators are icons on the screen display.

8. In a reproduction machine having a plurality of interactive machine components cooperable to produce copies from document originals including a control having a user interface and screen display, a self contained method of problem analysis comprising the steps of:
   entering into a problem analysis mode in the machine,
   providing a portion of the display to manifest a fault code if there is a declared machine fault,
   displaying a plurality of sub-system indicators related to non-declared machine problems, and
   visually representing a plurality of non-declared machine fault situations related to said one of the sub-system indicators to identify the non-declared fault situation.

9. In a reproduction machine having a plurality of interactive machine components cooperable to produce copies from document originals including a control having a user interface and screen display, a self contained method of problem analysis comprising the steps of:
   entering into a problem analysis mode in the machine,
   providing a portion of the display to manifest a fault code if a machine fault actually exists,
   displaying a first plurality of system indicators related to non-detected machine problems,
   activating one of the system indicators and
   displaying a second plurality of system indicators related to said one of the system indicators the second plurality of system indicators providing visual representations to identify said non-detected machine problem.

* * * * *